(12) United States Patent
Tanaka

(10) Patent No.: US 10,363,713 B2
(45) Date of Patent: Jul. 30, 2019

(54) TIRE VULCANIZING APPARATUS

(71) Applicant: SUMITOMO RUBBER INDUSTRIES, LTD., Kobe-shi, Hyogo (JP)

(72) Inventor: Takashi Tanaka, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 66 days.

(21) Appl. No.: 15/695,611

(22) Filed: Sep. 5, 2017

(65) Prior Publication Data

US 2018/0086016 A1    Mar. 29, 2018

(30) Foreign Application Priority Data

Sep. 26, 2016 (JP) .................. 2016-186910

(51) Int. Cl.
  *B29D 30/06*    (2006.01)
  *B29C 43/36*    (2006.01)

(52) U.S. Cl.
  CPC ...... *B29D 30/0654* (2013.01); *B29C 43/3642* (2013.01); *B29D 30/0606* (2013.01); *B29C 2043/3649* (2013.01); *B29D 2030/0616* (2013.01); *B29D 2030/0655* (2013.01); *B29D 2030/0657* (2013.01); *B29D 2030/0659* (2013.01)

(58) Field of Classification Search
  CPC ............ B29D 30/0606; B29D 30/0654; B29D 2030/0655; B29D 2030/0657; B29D 2030/0659
  See application file for complete search history.

(56) References Cited

U.S. PATENT DOCUMENTS

| 2,695,424 A | * | 11/1954 | Madison | ............ | B29D 30/0654 |
| | | | | | 277/646 |
| 3,989,429 A | * | 11/1976 | Mattson | ............. | B29D 30/0654 |
| | | | | | 425/52 |
| 9,120,281 B2 | * | 9/2015 | Satoh | ................. | B29D 30/0654 |

FOREIGN PATENT DOCUMENTS

| JP | 7-232331 | * | 9/1995 |
| JP | 2010-110970 A | | 5/2010 |

* cited by examiner

*Primary Examiner* — James P Mackey
(74) *Attorney, Agent, or Firm* — Birch, Stewart, Kolasch & Birch, LLP

(57) ABSTRACT

A vulcanizing bladder 3 comprises a first bladder 11 configured to contact with an inner circumferential surface of an unvulcanized tire (T) and a second bladder 12 arranged inside the first bladder 11. A first fluid G1 is to be supplied between the first bladder 11 and the second bladder 12, and a second fluid G2 is to be supplied to an inside of the second bladder 12. At least one of an inner circumferential surface 11s of the first bladder 11 and an outer circumferential surface 12s of the second bladder 12 is provided with a guide groove 31 extending in a tire axial direction through which the first fluid G1 can pass.

8 Claims, 4 Drawing Sheets

TIRE VULCANIZING APPARATUS

TECHNICAL FIELD

The present invention relates to a tire vulcanizing apparatus having a vulcanizing bladder with a double structure.

BACKGROUND ART

Conventionally, a tire vulcanizing apparatus for vulcanizing an unvulcanized tire by using a vulcanizing bladder is known. In this type of tire vulcanizing apparatus, for example, a heated fluid is supplied into the vulcanizing bladder to inflate the vulcanizing bladder.

For such fluid, steam is used from a point of view of cost and heat transfer performance, for example. However, when heat is transferred to the unvulcanized tire via the vulcanizing bladder, the steam is condensed to become drain and it is possible that the drain stays in the vulcanizing bladder.

Drain like this decreases temperature of the unvulcanized tire at a part in contact with the drain of the bladder relative to the temperature of the other part of the unvulcanized tire. Therefore, vulcanization unevenness occurs, which tends to cause imbalance in physical properties and performance of the tire. Further, such temperature decrease is also a cause of deteriorating the productivity because longer time is needed to vulcanize the tire.

For example, Japanese Unexamined Patent Application Publication No. 2010-110970 (Patent Document 1) has proposed a tire vulcanizing apparatus that diffuses steam and sequentially supplies steam to an entire inside of a vulcanizing bladder thereof. In the tire vulcanizing apparatus of Patent Document 1, even if the drain stays in the vulcanizing bladder, the temperature of the drain is increased by the steam that is sequentially supplied, and the temperature difference of the unvulcanized tire is decreased.

SUMMARY OF THE INVENTION

However, since the tire vulcanizing apparatus of Patent Document 1 sequentially supplies steam to the entire inside of the vulcanizing bladder, it requires a lot of energy. Further, this tire vulcanizing apparatus does not solve the problem of the drain staying in a lower part of the vulcanizing bladder.

In view of the above, the inventor of the present invention has proposed to provide a vulcanizing bladder with a double structure and supply steam between inner and outer bladders thereof. Thereby, a space to which the steam is supplied becomes small, therefore, it is less likely that drain is generated. Further, even when drain is generated, the generated amount of drain becomes small, therefore, it is easy to discharge the drain. Thereby, temperature distribution is made uniform on a circumference of the tire, therefore, it is possible that uneven vulcanization is suppressed.

However, when the vulcanizing bladder has a double structure, it is possible that the inner and the outer bladders come into contact with each other due to pressure balance and the like. When it actually happens, a path of the steam as a heat source is partially blocked, therefore, unevenness in the temperature distribution is induced. Further, the contact of the inner and the outer bladders hinders the discharge of the drain. Thereby, it is possible that an effect of suppressing vulcanization unevenness by the double structure is not sufficiently exerted.

A primary object of the present invention is to provide a tire vulcanizing apparatus having a vulcanizing bladder with a double structure which can suppress defects in fluid flow and drainage due to partial contact between an inner and an outer bladders thereof, and can exert an effect of suppressing vulcanization unevenness due to the double structure at a higher level.

In one aspect of the present invention, a tire vulcanizing apparatus comprises a vulcanizing bladder inflatable in an inner space of an unvulcanized tire to press the unvulcanized tire against a vulcanizing mold, a center device for holding the vulcanizing bladder, a supplier for supplying fluid to the vulcanizing bladder, a discharger for discharging the fluid in the vulcanizing bladder, the vulcanizing bladder comprising a first bladder configured to contact with an inner circumferential surface of the unvulcanized tire and a second bladder arranged inside the first bladder, the fluid including a first fluid to be supplied between the first bladder and the second bladder and a second fluid to be supplied to an inside of the second bladder, and at least one of an inner circumferential surface of the first bladder and an outer circumferential surface of the second bladder being provided with a guide groove extending in a tire axial direction.

In another aspect of the invention, it is preferred that the guide groove has a groove depth (H) in a range of from 2 to 10 mm and a groove width (w) in a range of from 2 to 20 mm.

In another aspect of the invention, it is preferred that the first bladder and the second bladder each have a tubular shape with upper and lower openings, and the center device comprises a lower flange portion holding each of lower end portions of the first bladder and the second bladder, a center post capable of moving up and down relative to the lower flange portion, and an upper flange portion provided at an upper end portion of the center post and holding each of upper end portions of the first bladder and the second bladder.

In another aspect of the invention, it is preferred that the supplier comprises a first supplier for supplying the first fluid and a second supplier for supplying the second fluid, the first supplier is arranged at the upper flange portion and provided with a first supply port having an opening between the upper end portion of the first bladder and the upper end portion of the second bladder, the second supplier is arranged at the lower flange portion and provided with a second supply port having an opening located on an inner side in the tire axial direction of the lower end portion of the second bladder.

In another aspect of the invention, it is preferred that the discharger is provided with a first discharge port arranged at the lower flange portion and having an opening between the lower end portion of the first bladder and the lower end portion of the second bladder.

In another aspect of the invention, it is preferred that a circulation path is formed in which the first fluid continuously flows during vulcanization process from the first supply port to the first discharge port through a space between the first bladder and the second bladder.

In the tire vulcanizing apparatus of the present invention, the vulcanizing bladder has a double structure including the first bladder and the second bladder, and the first fluid, which is steam for example, is to be supplied between the first bladder and the second bladder.

Thereby, a space to which the first fluid is to be supplied becomes small, therefore, it is less likely that the drain is generated. Further, even when the drain is generated, the generated amount of the drain becomes small, therefore, it is easy to discharge the drain. Thereby, a partial temperature decrease due to the drain is suppressed and the temperature distribution is made uniform on a circumference of the tire, therefore, it is possible that uneven vulcanization is suppressed.

Further, at least one of the inner circumferential surface of the first bladder and the outer circumferential surface of the second bladder is provided with the guide groove extending in the tire axial direction, therefore, it is possible that a gap is always secured between the first bladder and the second bladder during vulcanization process. Thereby, it is possible that flow failure of the first fluid and discharge failure of the drain due to partial blockage of the gap are suppressed, therefore, it is possible that the flow of the first fluid and the discharge of the drain are made smooth. As a result, it is possible that effect of suppressing the vulcanization unevenness due to the double structure is exerted at a higher level.

DESCRIPTION OF THE PREFERRED EMBODIMENT

An embodiment of the present invention will now be described in detail.

Figure 2:
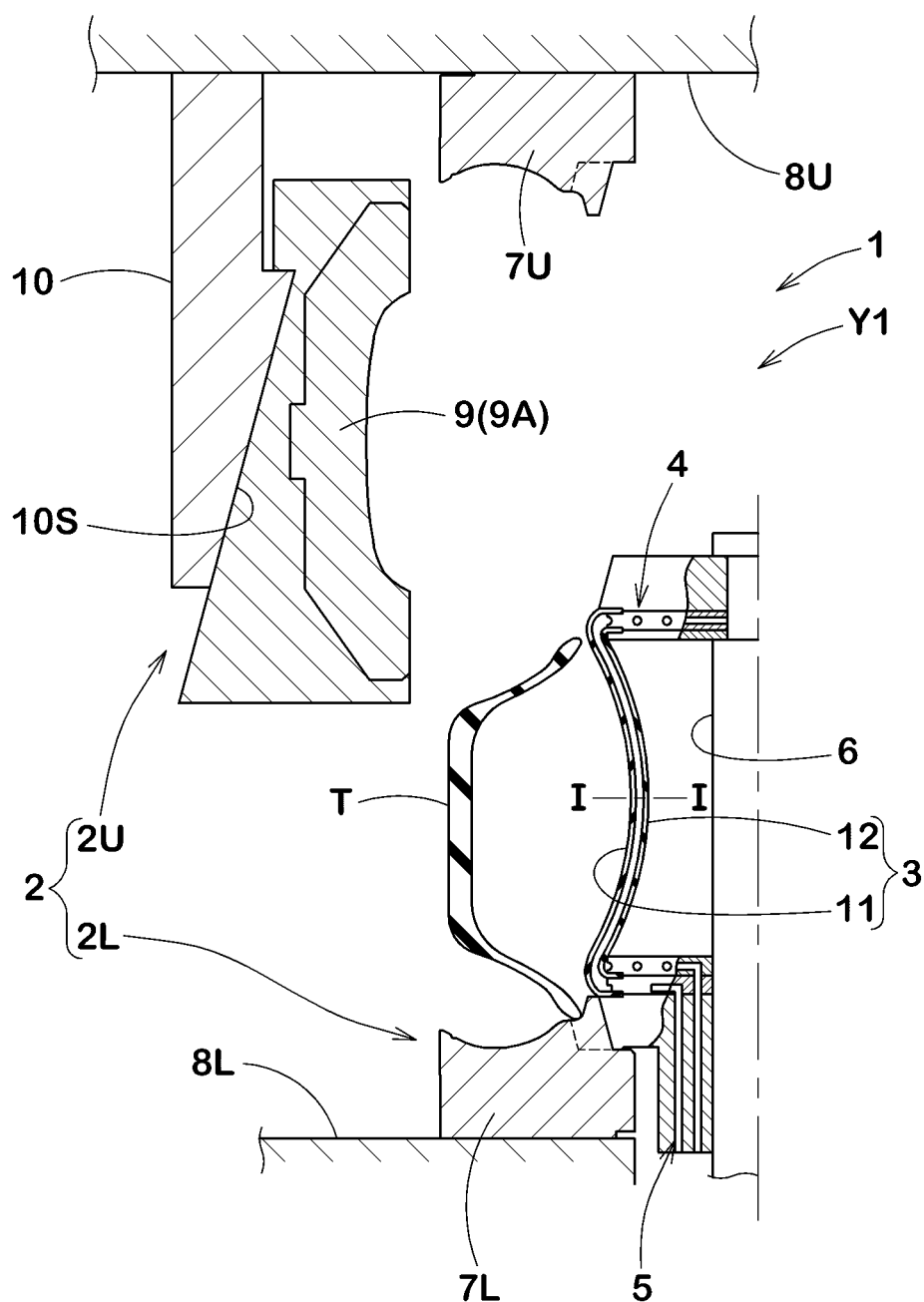
FIG. 2 is a partial cross-sectional view showing the tire vulcanizing apparatus in an open-mold state.

As shown in FIG. 2, a tire vulcanizing apparatus 1 in this embodiment includes a vulcanizing mold 2, a vulcanizing bladder 3 for vulcanizing and molding an unvulcanized tire (T) by pressing it against the vulcanizing mold 2, a supplier 4 for supplying fluid G to the vulcanizing bladder 3, a discharger 5 for discharging the fluid G in the vulcanizing bladder 3, and a center device 6 for holding the vulcanizing bladder 3.

The vulcanizing mold 2 comprises a lower mold portion 2L attached to a lower table (not shown) and an upper mold portion 2U attached to an upper table (not shown). The vulcanizing mold 2 in this embodiment is configured to be able to change, by up-and-down movement of the upper table, between an open-mold state Y1 in which the upper mold portion 2U and the lower mold portion 2L are vertically spaced apart from each other and a closed-mold state Y2 (shown in FIG. 1) in which the upper mold portion 2U and the lower mold portion 2L are vertically closed, that is they are in contact with each other. In the open-mold state Y1, the unvulcanized tire (T) is carried into the vulcanizing mold 2 and a vulcanized tire is removed. In the closed-mold state Y2, the unvulcanized tire (T) undergoes vulcanization molding.

The lower mold portion 2L in this embodiment includes a lower side mold 7L for molding a lower sidewall portion and a lower bead portion of the tire. The lower side mold 7L is supported by the lower table via a lower platen plate 8L, for example.

The upper mold portion 2U in this embodiment includes an upper side mold 7U for molding an upper sidewall portion and an upper bead portion of the tire and a tread mold 9 for molding a tread portion of the tire. The upper side mold 7U is supported, via an upper platen plate 8U for example, by the upper table which can move up and down.

Further, the tread mold 9 comprises a plurality of segments 9A divided in a circumferential direction, and each of the segments 9A is supported by, for example, a cylindrical container 10 attached to the upper platen plate 8U. specifically, the container 10 has a cone-shaped guide surface 10S, and each of the segments 9A is guided along the guide surface 10S, so that, by relative vertical movement of each of the segments 9A, the tread mold 9 can be enlarged and shrunk in diameter.

Figure 1:
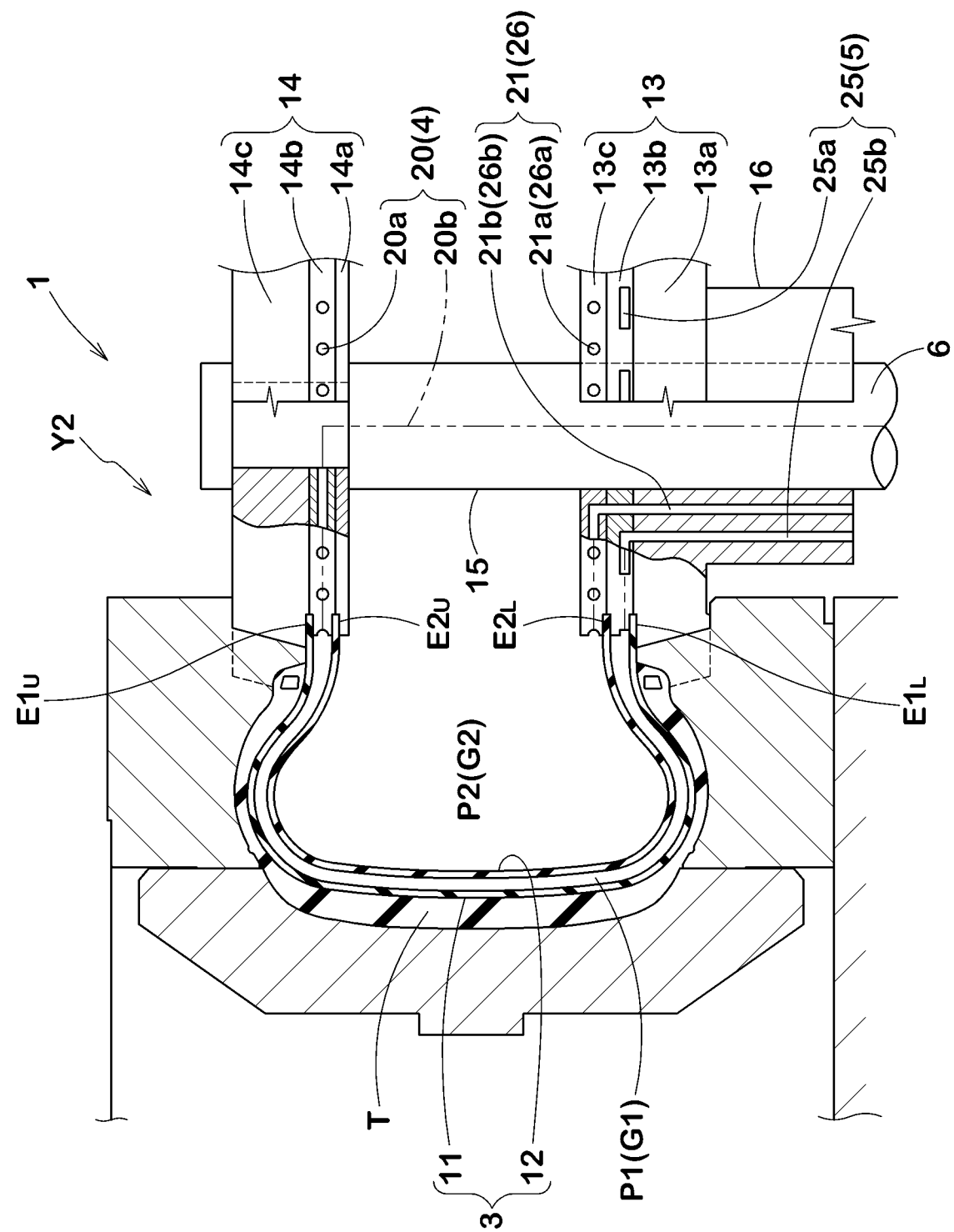
FIG. 1 is a partial cross-sectional view of a tire vulcanizing apparatus as an embodiment of the present invention.

As shown in FIG. 1, the vulcanizing bladder 3 is inflated in an inner space of the unvulcanized tire (T) in the closed-mold state Y2, thereby pressing the unvulcanized tire (T) against the vulcanizing mold 2. The vulcanizing bladder 3 has a double structure including a first bladder 11 which contacts with an inner circumferential surface of the unvulcanized tire (T) and a second bladder 12 which is arranged inside the first bladder 11.

Each of the first bladder 11 and the second bladder 12 has a tubular shape with upper and lower openings. A lower end portion E1L of the first bladder 11 and a lower end portion E2L of the second bladder 12 are held by a lower flange portion 13 of the center device 6 and an upper end portion E1U of the first bladder 11 and an upper end portion E2U of the second bladder 12 are held by an upper flange portion 14 of the center device 6. Note that the lower end portions E1L and E2L correspond respectively to lower opening edge portions of the first bladder 11 and the second bladder 12, and the upper end portions E1U and E2U correspond respectively to upper opening edge portions of the first bladder 11 and the second bladder 12.

The center device 6 is provided with, for example, the lower flange portion 13 supported by the lower table, a center post 15 capable of moving up and down relative to the lower flange portion 13, and the upper flange portion 14 attached to an upper end portion of the center post 15. Note that in the lower flange portion 13, a cylindrical body portion 16 through which the center post 15 is slidably inserted is concentrically formed.

The lower flange portion 13 in this embodiment includes a first flange portion 13a, a second flange portion 13b, and a third flange portion 13c, which are disk-like and stacked from a lower side to an upper side in this order, and the lower end portion E1L of the first bladder 11 is held between the first flange portion 13a and the second flange portion 13b. Further, the lower end portion E2L of the second bladder 12 is held between the second flange portion 13b and the third flange portion 13c. Similarly, the upper flange portion 14 in this embodiment includes a first flange portion 14a, a second flange portion 14b, and a third flange portion 14c, which are disk-like and stacked from the lower side to the upper side in this order, and the upper end portion E2U of the second bladder 12 is held between the first flange portion 14a and the second flange portion 14b. Further, the upper end portion E1U of the first bladder 11 is held between the second flange portion 14b and the third flange portion 14c.

First fluid G1 is to be supplied to space P1 between the first bladder 11 and the second bladder 12, and second fluid G2 is to be supplied to space P2 inside the second bladder 12. As the first fluid G1, steam which is a high-temperature and high-pressure heating medium can be suitably used. Further, as the second fluid G2, inert gas such as nitrogen gas, for example, which is a pressurizing medium can be suitably used.

The vulcanizing bladder 3 configured as such can press the unvulcanized tire (T) against the vulcanizing mold 2 by inflation of the first bladder 11 and can make the vulcanization progress by the heat from the first fluid G1. Further, by inflation of the second bladder 12, the space P1 can be decreased. Thereby, drain is difficult to be generated, and even when the drain is generated, amount of the generated drain is small, and it is possible that the drain is easily discharged.

It is preferred that inner pressure of the first bladder 11 when inflated and inner pressure of the second bladder 12 when inflated are substantially equal, thereby, it is possible that the space P1 is stabilized.

The supplier 4 includes a first supplier 20 for supplying the first fluid G1 and a second supplier 21 for supplying the second fluid G2.

The first supplier 20 is provided with a plurality of first supply ports 20a arranged in the upper flange portion 14, and the first supply ports 20a have openings between the upper end portion E1U of the first bladder 11 and the upper end portion E2U of the second bladder 12. The first supply ports 20a in this embodiment have the openings in an outer circumferential surface of the second flange portion 14b. Further, the first supplier 20 is provided with a first supply flow path 20b which passes through an inside of the center post 15 to be connected with each of the first supply ports 20a.

The second supplier 21 is provided with a plurality of second supply ports 21a arranged in the lower flange portion 13, and the second supply ports 21a have openings located on an inner side in a tire axial direction (on a side of a tire equator) of the lower end portion E2L of the second bladder 12. The second supply ports 21a in this embodiment have the openings in an outer circumferential surface of the third flange portion 13c. Further, the second supplier 21 is provided with a second supply flow path 21b which passes through an inside of the body portion 16 to be connected with each of the second supply ports 21a.

Further, the discharger 5 includes a first discharger 25 for discharging the first fluid G1 and a second discharger 26 for discharging the second fluid G2.

The first discharger 25 is provided with a plurality of first discharge ports 25a arranged in the lower flange portion 13 and the first discharge ports 25a have openings between the lower end portion E1L of the first bladder 11 and the lower end portion E2L of the second bladder 12. The first discharge ports 25a in this embodiment have the openings in an outer circumferential surface of the second flange portion 13b. Further, the first discharger 25 is provided with a first discharge flow path 25b which passes through an inside of the body portion 16 to be connected with each of the first discharge ports 25a.

Further, the second discharger 26 in this embodiment commonly uses the second supply ports 21a and the second supply flow path 21b of the second supplier 21 as the second discharge ports 26a and the second discharge flow path 26b, respectively.

Figure 3:
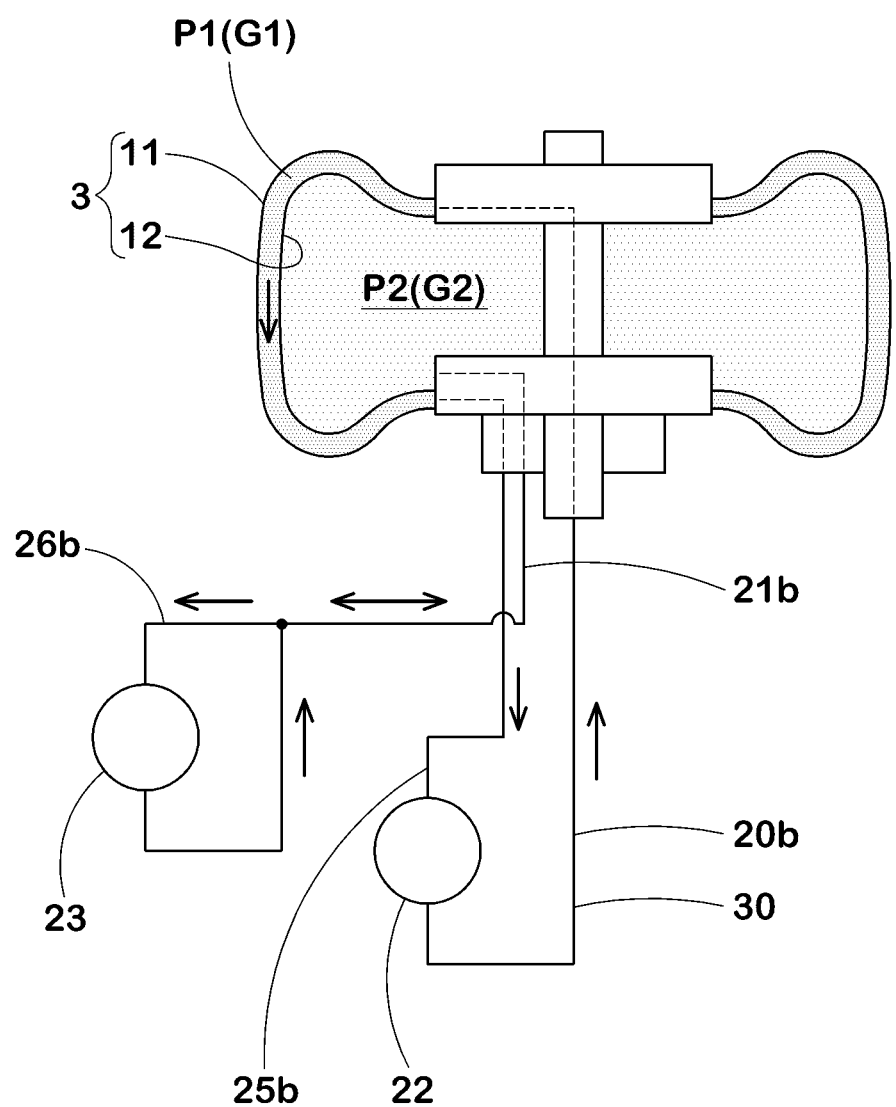
FIG. 3 is a conceptual diagram showing a piping configuration including a first supply flow path and a second supply flow path.

As conceptually shown in FIG. 3, the first supply flow path 20b in this embodiment is connected with a discharge port of a first fluid supply source 22 which is a boiler or the like, and the first discharge flow path 25b is connected with a return port of the first fluid supply source 22. Further, the second supply flow path 21b in this embodiment is connected with a discharge port of a second fluid supply source 23 which is a compressor or the like. The second discharge flow path 26b branches from the second supply flow path 21b and is connected with a return port of the second fluid supply source 23. In FIG. 3, a controller including an on-off valve, etc. is omitted, and only a basic piping configuration is shown.

In this embodiment, in order to give a sufficient amount of heat to the tire and to discharge the drain together with the first fluid G1 when the drain is generated, it is preferred that, during vulcanization process, the first fluid G1 flows continuously through the space P1 from the first supply ports 20a to the first discharge ports 25a. Thereby, the first supplier 20 and the first discharger 25 form a circulation path 30 in which the first fluid G1 continuously flows during vulcanization process.

Further, in the double-structured vulcanizing bladder 3, for example, due to pressure balance and the like between the first fluid G1 and the second fluid G2, the first bladder 11 and the second bladder 12 come into contact with each other so that the space P1 is partially blocked, therefore, it is possible that flow failure of the first fluid G1 and discharge failure of the drain occur.

Figure 4:
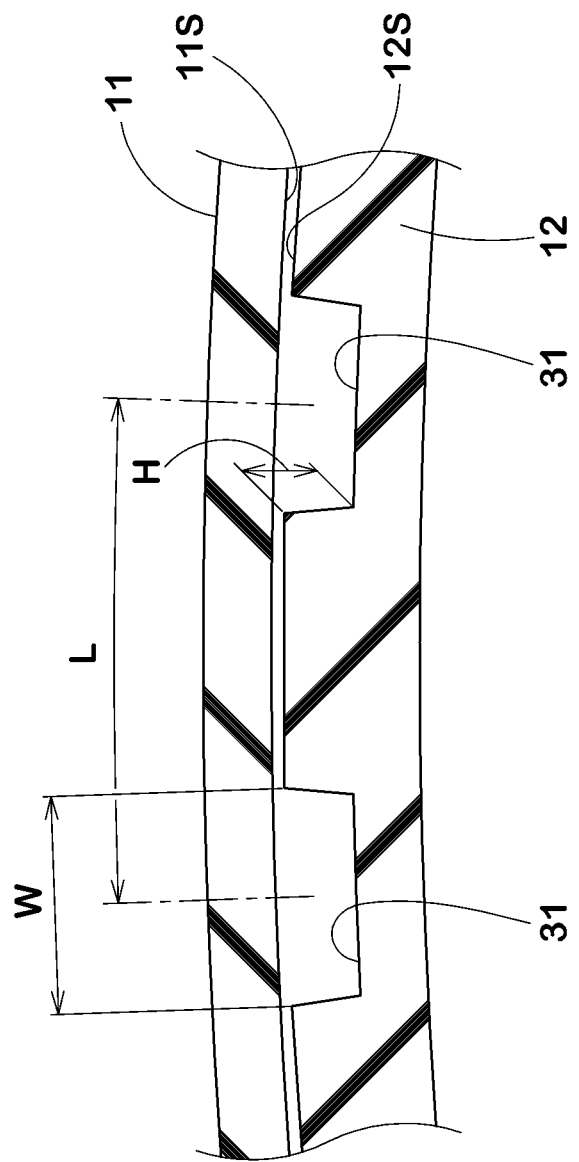
FIG. 4 is a cross-sectional view taken along line I-I of a vulcanizing bladder in FIG. 1.

Thereby, as shown in FIG. 4, at least one of an inner circumferential surface 11s of the first bladder 11 and an outer circumferential surface 12s of the second bladder 12 is provided with guide grooves 31 which extend in the tire axial direction (a radial direction) and through which the first fluid G1 can pass.

It is preferred that the guide grooves 31 extend continuously from the upper end portion E1U to the lower end portion E1L of the first bladder 11 or from the upper end portion E2U to the lower end portion E2L of the second bladder 12. Further, it is possible that the guide grooves 31 are inclined with respect to a tire axial direction line, and in this case, angles θ (not shown) of the inclination with respect to the tire axial direction line are preferably not greater than 30 degrees, more preferably not greater than 15 degrees.

It is preferred that groove depths (H) of the guide grooves 31 are in a range of from 2 to 10 mm and groove widths (w) are in a range of from 2 to 20 mm. If the groove depths (H) are smaller than 2 mm and the groove widths (w) are smaller than 2 mm, groove volumes become insufficient and it makes it difficult for the guide grooves to sufficiently suppress the flow failure, etc. of the first fluid G1. If the groove widths (w) are greater than 20 mm, the other bladder tends to enter into the guide grooves 31 so that the guide grooves 31 are blocked. Further, if the groove depths (H) are larger than 10 mm, it is necessary to increase thickness of the entire bladder in order to maintain durability of the bladder, which results in an unnecessary increase in cost.

Note that the groove depths (H) and the groove widths (w) are values measured of the bladder in a non-inflated state. Further, the groove depths (H) are widths of opening portions of the guide grooves 31 in a cross section perpendicular to a longitudinal direction of the guide groove 31.

Further, it is preferred that a distance L in the circumferential direction measured along a surface of the bladder between the guide grooves 31 is in a range of from 3 to 100 mm, and if it is larger than 100 mm, it is difficult to sufficiently suppress the flow failure, etc. of the first fluid G1. Further, if it is smaller than 3 mm, it tends to cause insufficiency in strength. The distance L is a value measured of the bladder in the non-inflated state at a position of an equatorial plane thereof.

While detailed description has been made of an especially preferred embodiment of the present invention, the present invention can be embodied in various forms without being limited to the illustrated specific embodiments.

WORKING EXAMPLE (EXAMPLE)

Unvulcanized tires of size 205/60R16 were vulcanization molded using a tire vulcanizing apparatus having structure shown in FIGS. 1 and 2, and having a vulcanizing bladder according to specifications shown in Table 1. Then, the variation (σ) of vulcanization amount among different parts of the test tires was evaluated.

Note that the vulcanizing bladders of reference and examples each have the double structure including the first bladder and the second bladder, and they differ only as to whether they have the guide grooves or not. The tires as the examples are provided with the guide grooves on the outer circumferential surfaces of the second bladders. Further, in order to prevent decrease in durability due to the guide grooves, in each of the examples, the bladder is formed thicker by the groove depths (H) of the guide grooves.

Common specifications are as follows.

The angles θ of the guide grooves with respect to the tire axial direction line: 0 degrees The distance L between the guide grooves in the circumferential direction: 30 mm Temperature of the vulcanizing mold (temperature of jacket of each of the platen plates and the container): 180 degrees The first fluid: steam (saturated steam at a pressure of 15 kgf/scm)

The second fluid: nitrogen gas (at a pressure of 15 kgf/scm)

Vulcanizing time: 10 minutes (1) Variation (σ) of Vulcanization Amount

Each of ten unvulcanized tires was vulcanized with thermocouples attached to 16 positions in the circumferential direction of an inside of a shoulder portion of the tire, and the temperature at each position during vulcanization process was measured. Then, from a temperature-time graph obtained by the measurement at each position, the vulcanization amount at each position was calculated based on the Arrhenius' equation, and the variation (σ) of the vulcanization amount was calculated and evaluated. Smaller variation (σ) of the vulcanization amount means less thermal energy needed for vulcanization of the tires.

(2) Cost of Bladder

In order to prevent decrease in durability of the bladders due to the guide grooves, the bladders are formed thicker by the groove depths (H) of the guide grooves, which leads to increase in material cost. Thereby, the material costs of the second bladders are indicated by an index based on that of the reference 1 being 100, wherein the larger numerical value indicates the higher cost.

TABLE 1

|  |  | Ref. 1 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- | --- |
| Presence or absence of Guide groove |  | absence |  |  |  |  | presence |  |  |  |  |
| Groove depth (H) | [mm] | 0 | 1 | 2 | 5 | 10 | 15 |  | 5 |  |  |
| Groove width (W) | [mm] | 0 |  |  | 10 |  |  | 1 | 2 | 20 | 25 |
| Variation (σ) of vulcanization amount | [ECU] | 1.62 | 1.44 | 0.65 | 0.52 | 0.54 | 0.51 | 1.25 | 0.71 | 0.75 | 1.31 |
| Cost of bladder |  | 100 | 110 | 120 | 150 | 200 | 250 | 150 | 150 | 150 | 150 |

As shown in Table 1, it can be confirmed that in the examples, the temperature distribution on circumferences of the tires can be made uniform, and that the vulcanization unevenness can be suppressed by suppressing the variation (σ) of the vulcanization amount.

The invention claimed is:

1. A tire vulcanizing apparatus comprising:
   a vulcanizing bladder inflatable in an inner space of an unvulcanized tire to press the unvulcanized tire against a vulcanizing mold;
   a center device for holding the vulcanizing bladder;
   a supplier for supplying fluid to the vulcanizing bladder;
   a discharger for discharging the fluid in the vulcanizing bladder;
   the vulcanizing bladder comprising a first bladder configured to contact with an inner circumferential surface of the unvulcanized tire and a second bladder arranged inside the first bladder,
   the fluid including a first fluid to be supplied between the first bladder and the second bladder and a second fluid to be supplied to an inside of the second bladder, and
   at least one of an inner circumferential surface of the first bladder and an outer circumferential surface of the second bladder being provided with a guide groove extending in a tire axial direction.

2. The tire vulcanizing apparatus according to claim 1, wherein
   the guide groove has a groove depth (H) in a range of from 2 to 10 mm and a groove width (W) in a range of from 2 to 20 mm.

3. The tire vulcanizing apparatus according to claim 1, wherein
   the first bladder and the second bladder each have a tubular shape with upper and lower openings, and
   the center device comprises a lower flange portion holding each of lower end portions of the first bladder and the second bladder, a center post capable of moving up and down relative to the lower flange portion, and an upper flange portion provided at an upper end portion of the center post and holding each of upper end portions of the first bladder and the second bladder.

4. The tire vulcanizing apparatus according to claim 3, wherein
   the supplier comprises a first supplier for supplying the first fluid and a second supplier for supplying the second fluid,
   the first supplier is arranged at the upper flange portion and provided with a first supply port having an opening between the upper end portion of the first bladder and the upper end portion of the second bladder,
   the second supplier is arranged at the lower flange portion and provided with a second supply port having an opening located on an inner side in the tire axial direction of the lower end portion of the second bladder.

5. The tire vulcanizing apparatus according to claim 3, wherein
   the discharger is provided with a first discharge port arranged at the lower flange portion and having an opening between the lower end portion of the first bladder and the lower end portion of the second bladder.

6. The tire vulcanizing apparatus according to claim 2, wherein
   the first bladder and the second bladder each have a tubular shape with upper and lower openings, and
   the center device comprises a lower flange portion holding each of lower end portions of the first bladder and the second bladder, a center post capable of moving up and down relative to the lower flange portion, and an upper flange portion provided at an upper end portion of the center post and holding each of upper end portions of the first bladder and the second bladder.

7. The tire vulcanizing apparatus according to claim 4, wherein the discharger is provided with a first discharge port arranged at the lower flange portion and having an opening between the lower end portion of the first bladder and the lower end portion of the second bladder.

8. The tire vulcanizing apparatus according to claim 7, wherein a circulation path is formed in which the first fluid continuously flows during vulcanization process from the first supply port to the first discharge port through a space between the first bladder and the second bladder.

\* \* \* \* \*